Figure 1:
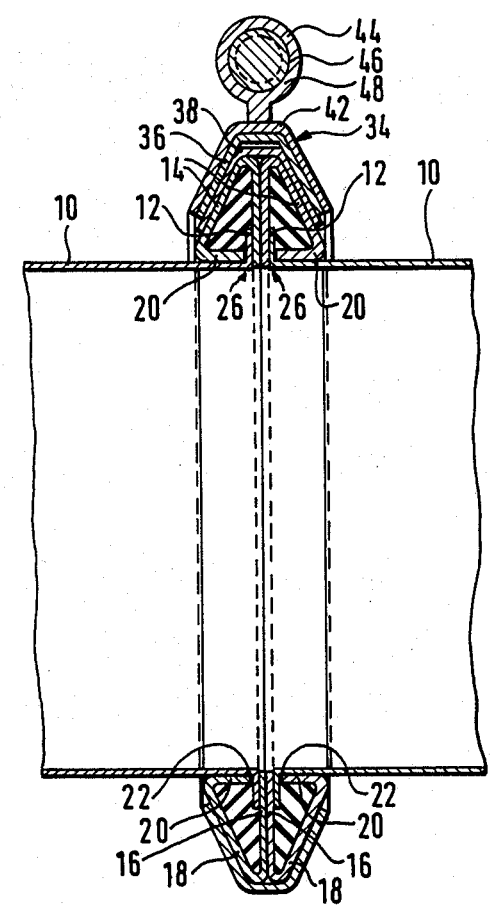

United States Patent [19]

Meinig

[11] Patent Number: 4,822,083
[45] Date of Patent: Apr. 18, 1989

[54] BUTT JOINT BETWEEN TWO THIN-WALLED ROUND SHEET METAL PIPE SECTIONS

[75] Inventor: Manfred Meinig, Rietheim-Weilheim, Fed. Rep. of Germany

[73] Assignee: Metu-System Meinig KG, Rietheim-Weilheim, Fed. Rep. of Germany

[21] Appl. No.: 179,868

[22] Filed: Apr. 11, 1988

[30] Foreign Application Priority Data

Apr. 22, 1987 [DE] Fed. Rep. of Germany ....... 3713461

[51] Int. Cl.⁴ .............................................. F16L 23/00
[52] U.S. Cl. .................................... 285/367; 285/424
[58] Field of Search ................ 285/367, 424, 410, 414

[56] References Cited

U.S. PATENT DOCUMENTS 3,498,649 3/1970 Pfeuffer .......................... 285/424 X
4,679,832 7/1987 Meinig ............................... 265/414

FOREIGN PATENT DOCUMENTS 678347 1/1964 Canada ................................ 285/367
2758295 6/1979 Fed. Rep. of Germany ...... 285/424
561684 5/1944 United Kingdom ............... 285/367

Primary Examiner—Dave W. Arola
Attorney, Agent, or Firm—Leonard Bloom

[57] ABSTRACT

Butt joint between two thin-walled round sheet metal pipe sections. The butt joint has a flange ring (14) with a triangular hollow section at each pipe end (10); said hollow section has a slit (26, 26') at its radially inner side, into which the radial annular edge (12), flanged at pipe end (10), is inserted. As a result, the annular edge (12) is prevented from getting caught in the opposite pipe end (10) and, at the same time, a firm fit of the flange ring (14) is guaranteed on the appropriate pipe end (10).

4 Claims, 2 Drawing Sheets

U.S. Patent      Apr. 18, 1989      Sheet 1 of 2      4,822,083

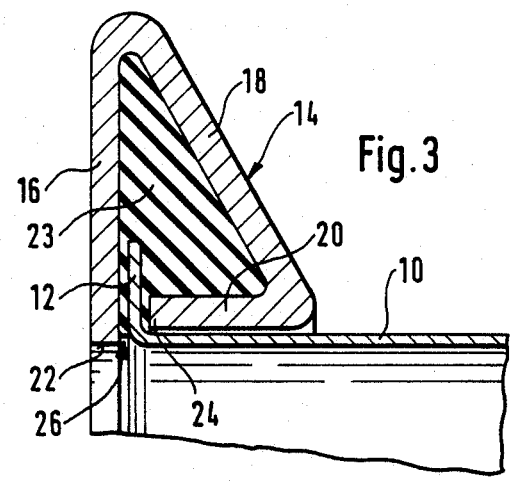
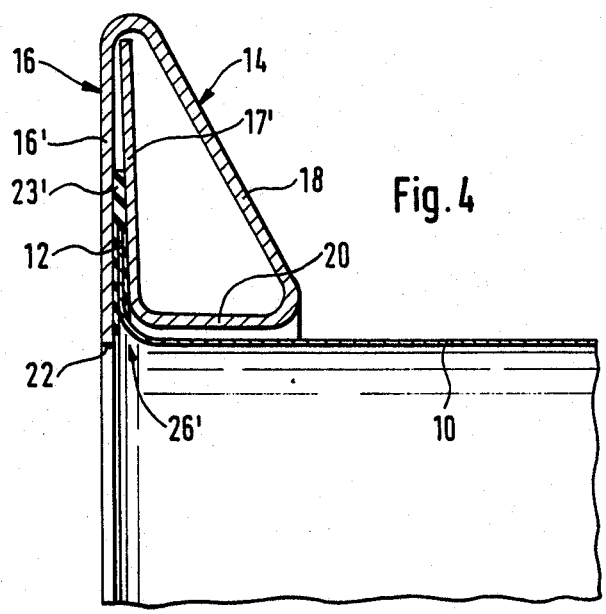

BUTT JOINT BETWEEN TWO THIN-WALLED ROUND SHEET METAL PIPE SECTIONS

A butt joint of the prior art was made known in German Pat. No. B 35 37 504. When putting the known butt joint together at a construction site, it is necessary to align the two pipe ends fairly well radially and axially, so that a flawless connection can be achieved via the clamping ring which is to be placed onto the flange ring. This is quite possible with smaller pipe diameters, but not with larger and heavier pipes or in cramped space conditions. If the end of the pipe to be mounted is moved radially against the pipe end already mounted and placed diagonally onto this pipe end, then it can happen that the annular edge of the pipe to be mounted comes to rest inside the already fixed pipe. When the mounted clamping ring is tightened, the desired radial alignment cannot now take place automatically since the annular edge is caught inside the opposite pipe. Since the clamping ring, when it is being tightened, exerts an axial tension at the same time, the annular edge is prevented from moving away from the firmly mounted pipe and thus is unable to get out of the pipe interior. The axial displacement of the two pipe ends will thus remain permanent when the clamping ring is tightened. The only possibility of eliminating this faulty condition is to loosen the already tightened clamping ring again, align the pipes axially and radially and then place the clamping ring on again and tighten it again.

Furthemore, when connecting the butt joint of German Pat. No. B 35 37 504, it is not very easy to secure the mounted flange rings at the annular edges of the pipes prior to mounting and tightening the clamping ring. According to the noted patent, seams which hold the respective flange rings are provided for this purpose. As a result, of course, it becomes more expensive to manufacture the butt joint.

A butt joint of the above-noted type is to be improved by means of the invention in such a way that it is no longer possible for an annular edge to become caught in the opposite pipe end and that, at the same time, the flange ring mounted on the pipe ends are secured at the annular edges even prior to tightening the clamping ring.

This object is solved according to the invention by means of the characterizing features below.

When making the butt joint according to the invention, the flange rings must merely be placed or slipped onto the respective matching annular edges, as a result of which they are fixed in the proper position with respect to the pipe ends. By inserting the annular edges into the slit of the respective flange ring, it is impossible for the annular edge to become caught in the opposite pipe end and, when the clamping ring is mounted and tightened, an automatic axial and radial alignment of the two pipe ends can take place freely without an exact prior alignment.

In an especially simple embodiment of the invention, the two free longitudinal edges of the flange ring abut against each other at a right angle while forming the slit into which the matching annular edge is inserted. This embodiment is primarily preferable with relatively thick-walled constructions of the flange section.

If one prefers a more secure clamping of the annular edge, then, in particular, with a thin-walled construction of the flange section, the wall parallel to the annular edge can, according to claim 2, be constructed as a double wall, whereby the annular edge is pressed in between the two wall sections. Consequently, a secure fit is attained.

Moreover, when constructing the butt joint according to the invention, the possibility of an especially simple and good sealing is attained by embedding the annular edge, which is inserted into the slit, in sealing material in accordance with claim 3. In this way, the sealing is completely protected and cannot be altered in its position or influenced in its function when the pipe ends are mounted.

Figure 2:
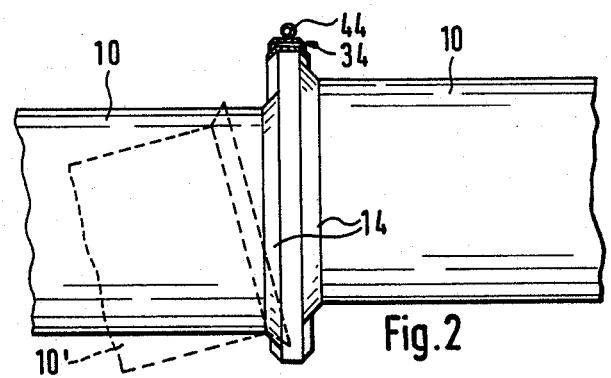

Embodiments of the invention are illustrated in greater detail with reference to the drawings, showing:

FIG. 1 an axial section through a butt joint,

FIG. 2 a reduced illustration of the butt joint, shown in FIG. 1, during mounting of the clamping ring, FIG. 3 a partial section through a pipe end with mounted flange ring in accordance with a first embodiment and FIG. 4 a partial section, similar to FIG. 3, through a second embodiment.

The butt joint shown in FIGS. 1–3 connects two pipe ends 10, made of a thin-walled round sheet metal pipe, with one another. Each pipe 10 is flanged at its end to a circular radial annular edge 12. A flange ring 14, having a triangular hollow section, abuts against each annular edge 12. Thereby, each flange ring 14 has a radial wall 16 adjacent to the annular edge 12, a wall 18 which leads back diagonally to the pipe from the outer end of wall 16 and a wall 20 adjacent to pipe 10.

A clamping ring 34 is mounted onto the outside of both flange rings 14, namely, in particular, also onto the inclined walls 18 thereof; said clamping ring 34 is interrupted in axial direction, which is not shown, so that it can be expanded and mounted onto the flange rings. The two ends 36 and 38 of the clamping ring 34 overlap when the clamping ring is tightened, in the manner illustrated in FIG. 1. An apron 42, with which a guide bearing 44, extending in peripheral direction of the clamping ring 34, is connected, is welded to the outer clamping ring end 36. The screw part 46 of a screw clamp 48, firmly connected with the inner clamping ring end 38, is guided in a sliding manner in the guide bearing 44.

In the embodiment shown in FIG. 3, the radial wall 16 of the flange ring 14, which is parallel to the annular edge 12, has a radially inner free edge 22 which forms a slit 26, into which the annular edge 12 is inserted, together with the free edge 24 of the wall 20 extending parallel to the pipe end 10. The hollow section of the flange ring 14 is filled with a sealing material 23 into which the annular edge 12 is, for the most part, embedded.

In the embodiment shown in FIG. 4, the radial wall 16 of the flange ring 14 is constructed as a double wall and has two wall sections 16' and 17', which are almost parallel or extend slightly diagonally to one another, as a result of pressing the annular edge 12 in, and are adjacent to the two sides of the annular edge 12. Wall 18 proceeds from the outer end of wall section 16' and leads back diagonally to pipe end 10; wall 20, which is adjacent to pipe end 10, adjoins said wall 18. Wall section 17', pointing radially outward, adjoins the end of wall 20 which is situated toward wall section 16'; the second free edge of the flange ring 14 is located at the radially outer end of said wall section 17'. The annular edge 12 is inserted into the slit 26' between wall sections 16' and 17' of the flange ring 14 from the radially inner side. This insertion can take place by means of press fitting, so that a good securing of the flange ring 14 on the pipe end 10 is attained in every case.

A sealing material 23', into which the annular edge 12 is embedded for the most part, is inserted between walls 16' and 17'. The sealing material 23' is, as sealing material 23 in the embodiment of the invention in FIG. 3, protected to a great extent against mechanical damage and outer stress. As a result, a tight and durable connection of the flange rings with the pipe ends is guaranteed.

To mount the clamping ring 34 onto the already mounted flange rings 14, the clamping ring 34, which already forms a closed ring with overlapping ends, yet is opened as far as possible, is hung over the flange ring 14 of the already firmly mounted pipe section 10 in the manner shown in FIG. 2. The pipe section 10, which is not yet firmly mounted, is then hung from the bottom with its flange ring 14 into the clamping ring 34, which hangs loosely on the opposite pipe end, in the inclined position 10' which is drawn in with a broken line in FIG. 2, and then tilted upward into the position shown in solid lines. The clamping ring 34 can subsequently be tightened in a manner which is not illustrated, whereby the two connecting flanges 14 are pressed against each other, preferably, by insertion of a sealing which is not illustrated.

I claim:

1. Butt joint between two round pipe sections each having an annular edge projecting radially at the pipe end, whereby the pipe sections are formed as thin-walled sheet metal pipe sections, one flange ring each is mounted onto the outside of each sheet metal pipe section, which is adapted to abut against the matching annular edge, and each flange ring, extending substantially around the circumference of the pipe ends, has an essentially closed hollow section with a right triangular cross-section being defined by two leg portions and a hypotenuse, the hypotenuse side of the hollow section, lying diagonally to the respective annular edge, points away from the annular edge and the pipe section, and whereby the two flange rings are held together by a clamping ring which can be tightened and is mounted from the outside, characterized in that the wall of each flange ring, which forms one of the leg portions which is parallel to the annular edge, has a free edge at its radially inner surface and the other leg portion terminates short of said free edge defining a slit therebetween and the matching annular edge is inserted into the slit defined between the edge and an adjoining wall which forms the other leg portion of the flange ring.

2. Butt joint according to claim 1, characterized in that the wall of each flange ring, which is parallel to the annular edge, is constructed as a double wall, whereby the section of the wall, facing the pipe ends of the butt joint, supports the free edge and that the matching annular edge is inserted between the two wall sections forming the double wall.

3. Butt joint according to claim 2, characterized in that the annular edge is embedded, at least partially, into a sealing material which fills the inside of the flange ring.

4. Butt joint according to claim 2, characterized in that the annular edge is embedded, at least partially, into a sealing material which is inserted between the wall sections.

* * * * *